（12）United States Patent
Eluripati et al.

(10) Patent No.: US 7,698,898 B2
(45) Date of Patent: Apr. 20, 2010

(54) MIXER FOR COOLING AND SEALING AIR SYSTEM FOR TURBOMACHINERY

(75) Inventors: Ravi Praveen S. Eluripati, Simpsonville, SC (US); David W. Ball, Jr., Easley, SC (US); Kenneth N. Whaling, Simpsonville, SC (US); James L. Davis, Taylors, SC (US); Nattamai V. Saravanan, Chennai (IN); Ajit S. Sengar, Bangalore (IN)

(73) Assignee: General Electric Company, Schenectady, NY (US)

( * ) Notice: Subject to any disclaimer, the term of this patent is extended or adjusted under 35 U.S.C. 154(b) by 512 days.

(21) Appl. No.: 11/732,689

(22) Filed: Apr. 4, 2007

(65) Prior Publication Data

US 2009/0067988 A1 Mar. 12, 2009

(51) Int. Cl.
 *F02C 6/04* (2006.01)
(52) U.S. Cl. .......................................... 60/785; 60/782
(58) Field of Classification Search .................. 60/785, 60/782, 795, 806; 415/116, 144
See application file for complete search history.

(56) References Cited

U.S. PATENT DOCUMENTS

| 6,082,635 | A | * | 7/2000 | Seiner et al. ............ 239/265.19 |
| 6,412,270 | B1 | | 7/2002 | Mortzheim et al. ........ 60/39.02 |
| 6,550,253 | B2 | | 4/2003 | Mortzheim et al. ........... 60/782 |
| 6,584,779 | B2 | | 7/2003 | Priestley ....................... 60/782 |
| 6,615,574 | B1 | | 9/2003 | Marks ....................... 60/39.02 |
| 2005/0082384 | A1 | * | 4/2005 | Whitefoot et al. ........... 239/104 |

* cited by examiner

*Primary Examiner*—Michael Cuff
*Assistant Examiner*—Vikansha S Dwivedi
(74) *Attorney, Agent, or Firm*—James W. Pemrick; Ernest G. Cusick; Frank A. Landgraff

(57) ABSTRACT

A system for mixing flows from a compressor is provided. The system comprises an ejector that combines a first flow and a second flow, from the compressor, into a third flow. A bypass flow is connected between the first flow and the third flow. A mixer combines the bypass flow and the third flow into a fourth flow. The fourth flow has a pressure and temperature intermediate the respective pressures and temperatures of the bypass flow and the third flow.

20 Claims, 3 Drawing Sheets

MIXER FOR COOLING AND SEALING AIR SYSTEM FOR TURBOMACHINERY

BACKGROUND OF THE INVENTION

The present invention relates generally to the cooling and sealing air system in turbomachinery. In particular, the invention relates to a mixer used in the cooling and sealing air system in turbomachinery.

The cooling and sealing air system in a turbomachine (e.g., a turbine) utilizes air from the compressor (e.g., an axial flow compressor) to: (1) cool internal parts of the gas turbine, (2) cool the turbine outer shell and exhaust frame, (3) seal the turbine bearings, (4) prevent compressor pulsation, and (5) provide an air supply for air operated valves.

The following example describes some of the functions of the cooling and sealing air system in an exemplary gas turbine, and is not intended to limit the scope of the present invention in any way. During the startup sequence of a gas turbine, air is extracted from the $9^{th}$ and $13^{th}$ stages of the axial flow compressor and is vented to atmosphere. These $9^{th}$ and $13^{th}$ stage extractions, together with the inlet guide vanes in the closed position, limits airflow through the compressor and prevents compressor pulsation.

During normal operation of the gas turbine, air from the $9^{th}$ and $13^{th}$ stages is used for cooling and sealing $2^{nd}$ and $3^{rd}$ stages of the gas turbine. This is achieved by means of external piping and flow controlling orifices sized to meet the worst case operating requirements of the gas turbine, typically the cold and hot day operating conditions. The pressurized air entering the $2^{nd}$ and $3^{rd}$ stage casing manifolds purges the hot turbine air from the $2^{nd}$ and $3^{rd}$ stage wheel space cavities.

While the turbine is being unloaded or shut down, the cooling and sealing air system continues to cool and seal the turbine wheel space cavities and the interior turbine components. Air from the $9^{th}$ and $13^{th}$ stages of the compressor is again vented through the exhaust plenum. This prevents compressor pulsation during the turbine deceleration period.

The diverted air from the axial flow compressor can consume a large proportion of the total air flow through the compressor, for example, as much as 20%. The management and control of these parasitic flows can dramatically increase the performance of the turbine. The extraction ports often provide cooling air flow at too high a pressure and/or temperature and typically the flow is throttled, resulting in a net loss of energy. By employing an ejector, the low pressure/temperature flow (e.g., from the $9^{th}$ compressor stage) may be mixed with the high pressure/temperature flow (e.g., from the $13^{th}$ compressor stage) to provide a flow at an intermediate pressure and temperature substantially matching the pressure and temperature required to cool a turbine component, while simultaneously making use of low pressure and temperature air which otherwise might be dissipated as wasted energy.

An ejector in a cooling and sealing air system of a gas turbine helps in reducing the usage of expensive (i.e., in terms of work expended) high-pressure air by replacing it with relatively inexpensive low-pressure air. The ratio of the mass flow of low-pressure air pumped by the ejector by expending a pound of high-pressure air is called the entrainment ratio. For maximum benefit of the ejector system, a high entrainment ratio is expected over all operating conditions of the gas turbine. Depending on the cooling flow requirement of the turbine, bypass flow is needed at several operating conditions. A high entrainment ratio improves overall gas turbine performance (both efficiency and output).

Ejectors, however, have no moving parts and are designed for operation at specific design points based on ISO day conditions. ISO standard day conditions are 59° F., 14.7 psia, 60% relative humidity or 15° C. (288° K.), 101.3 kilopascals, 60% relative humidity. For turbine applications, the turbine inlet conditions to the ejector are a function of ambient day conditions in which the turbomachinery operates. The ambient day variations seen by the gas turbine can vary, for example, from −20° F. to +120° F., which results in about a 50% temperature and about 50% pressure variation on the inlet/exit conditions to the ejector. This variation has a strong effect on the operational characteristics of the ejector to the extent that, at many ambient day conditions, the ejector will not provide adequate cooling and/or purge flow. That is, the ejector behaves differently on different days and at different times during each day, and on certain days, the ejector will provide insufficient benefit.

BRIEF DESCRIPTION OF THE INVENTION

In one aspect of the invention a system is provided for mixing flows from a compressor. An ejector receives a first flow and a second flow from the compressor, and combines the first and second flows into a third flow. The first flow has a first pressure and a first temperature, and the second flow has a second pressure and a second temperature. The first and second pressures are different and the first and second temperatures are different. A bypass flow is connected between the first flow and the third flow. A mixer combines the bypass and third flows into a fourth flow. The fourth flow has a pressure and temperature intermediate the pressure and temperature of the bypass and third flows. The bypass flow meets and mixes with the third flow at a mixing angle, which is at least about 0 degrees, but not more than about 90 degrees.

In another aspect of the invention a system is provided for mixing flows from a compressor. An ejector receives a first flow and a second flow from the compressor, and combines the first and second flows into a third flow. A bypass flow is connected between the first flow and the third flow. A mixer combines the bypass flow and third flows into a fourth flow. The bypass flow meets and mixes with the third flow at a mixing angle, which is at least about 0 degrees, but not more than about 90 degrees.

DETAILED DESCRIPTION OF THE INVENTION

Figure 1:
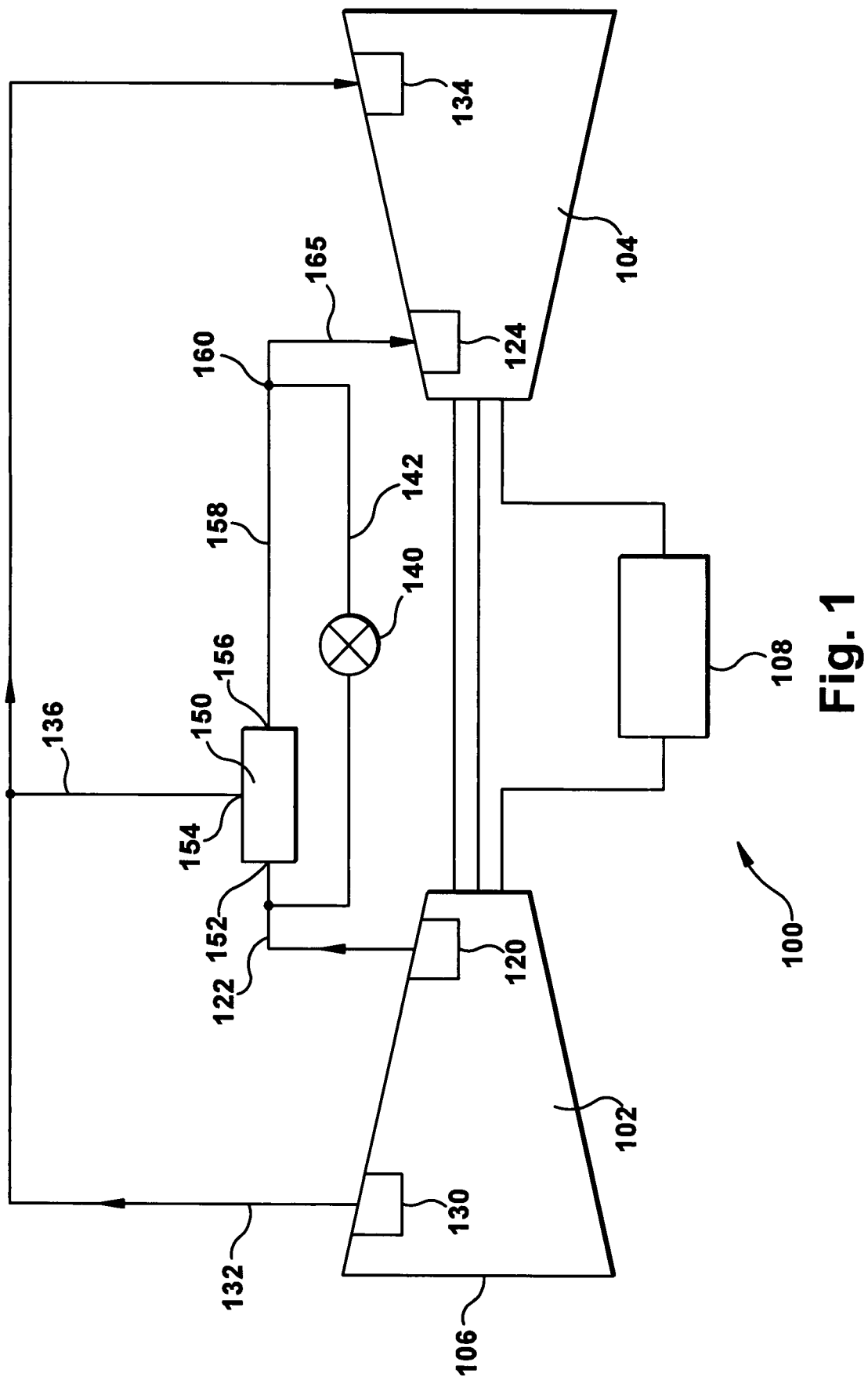
FIG. 1 is a schematic illustration of compressor and turbine sections and the cooling and sealing air system of an exemplary turbomachine.

Referring now to the drawings, particularly to FIG. 1, there is illustrated an exemplary turbomachine, generally designated 100, including a compressor 102 and a turbine 104. The compressor 102 has an inlet 106 for receiving ambient air that is subsequently compressed through a number of different stages of the compressor 102, each stage compressing the air to higher pressures and temperatures. The compressed air is primarily for delivery to combustors 108 where the pressurized air is combined with fuel and combusted to provide hot gases of combustion to the various stages of the turbine 104. Bleed air is typically removed from various stages of the compressor for use as cooling/purge air flow in the turbine 104. Thus, a portion of the compressor 102 air flow is diverted from flow through the combustors 108 for these other purposes. For example, cooling air is often provided to the nozzles of the turbine 104. In FIG. 1, and as a representative example, high pressure air extraction is taken from the 13$^{th}$ stage 120 of compressor 102 and provided as cooling air flow to a first site 124 of the turbine 104, e.g., a second stage nozzle, via a flowpath 122. Similarly, bleed air is extracted from an earlier stage, e.g., the 9$^{th}$ stage 130 of compressor 102, and supplied via flowpath 132 as cooling air to a second site 134 of the turbine, e.g., a third stage nozzle. A throttling valve 140 is provided in a bypass flowpath 142 for purposes explained below.

An ejector 150 is employed in flowpath 122 which effectively eliminates the need to dissipate bleed air pressure across an orifice or similar device in flowpath 132 and enables mixing of bleed air from flowpaths 122 and 132 to adjust extraction flows to optimize machine performance. An ejector 150 is a mechanical device with no moving parts or required external energy input which mixes two fluid streams based on a momentum transfer. The ejector 150 has an inlet 152 for the high pressure motive fluid received via line 122, an inlet 154 for the low pressure or suction fluid received via a flowpath 132, 136.

By locating the injector 150 in the flowpath 122, the high pressure extraction flow from the 11th stage 120 of the compressor 102 serves as the motive flow at inlet 152. The lower pressure, lower temperature flow via flowpath 132 flows to the ejector 150 via a crossover flowpath 136 and serves as the suction flow via inlet 154. Thus, the two flows are mixed together and flow through the outlet 156 of the ejector 150 forming a third flow 158 at a pressure and temperature intermediate the pressure and temperature of the respective motive and suction flows. It will be appreciated that the ejector, therefore, has no moving parts and is designed to operate at a specified design point based on ISO day conditions. Because the inlet conditions and hence the characteristics of the flows supplied to the ejector are a function of ambient day conditions, the operational characteristics of the ejector are affected and the ejector behaves differently as a function of time and atmospheric conditions.

The performance of a fixed nozzle ejector is optimum at a fixed set of operating conditions (i.e., inlet & exit pressures and temperatures). However, the extraction pressures of a gas turbine compressor 102 (i.e., the motive and suction pressures of the ejector 150) and the required cooling flow supply pressure of a turbine 104 (i.e., the discharge pressure of ejector 150) vary with ambient temperature and operating load. The optimum operating conditions for ejector 150 occur when the ambient temperature is above 70° F. and at part loads (e.g., below 50% load on turbine 104). Therefore, at cold day operating conditions (i.e., less than 70° F. ambient temperature), it is required to provide a bypass line 142 parallel to the ejector 150 to provide additional cooling flow required by the turbine 104 that the ejector 150 cannot supply alone.

Figure 2:
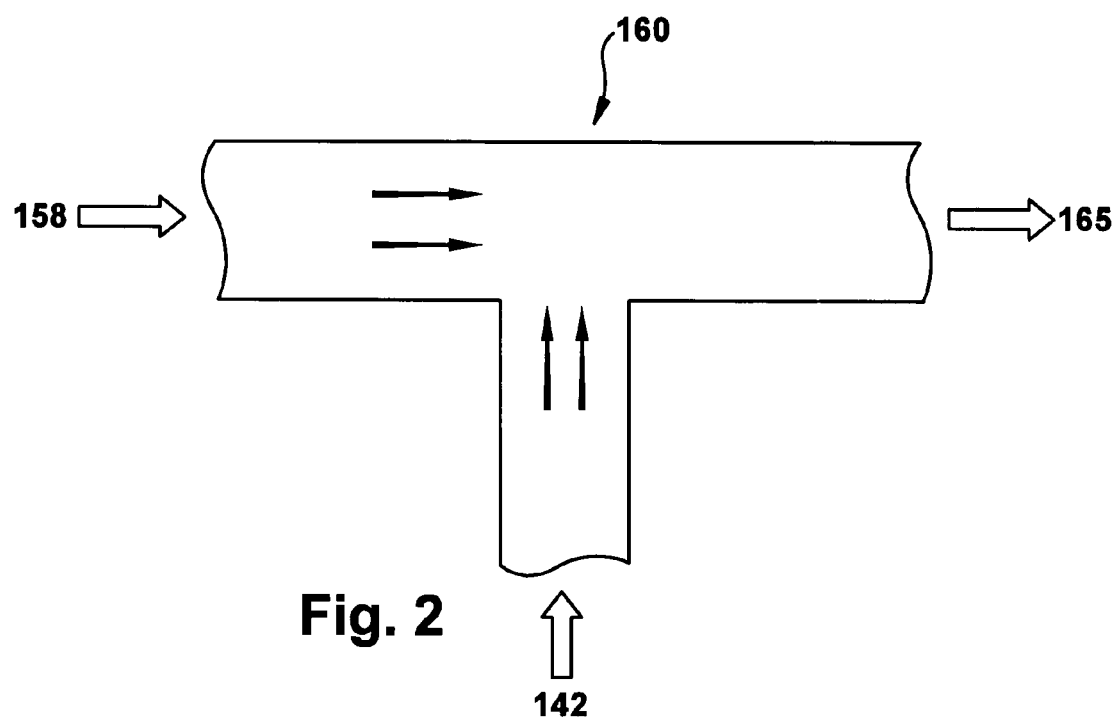
FIG. 2 is an enlarged cross-sectional view of the T junction mixer used in the cooling and sealing air system of the exemplary turbomachine illustrated in FIG. 1.

The conventional method of mixing ejector output 158 and bypass flow 142 uses a standard T junction. The T junction is illustrated at 160 in FIGS. 1 and 2. Referring to FIG. 2, the T junction 160 mixes the ejector output 158 and the bypass flow 142 at right angles. The output of the T junction 160 is indicated by 165 in FIG. 1 and FIG. 2. When the two flows are mixed at a 90° angle, the overall velocity of the combined output flow 165 is reduced. This leads to higher backpressure on the ejector 150. The performance of the ejector 150 is a strong function of the ejector discharge pressure, and the conventional method leads to low or no entrainment at cold day operating conditions. A better method and apparatus, as embodied by the invention, to mix ejector output 158 and bypass flows 142 that lead to lower ejector discharge pressure causing higher performance benefits during cold day & part load operating conditions, is herein described.

Figure 3:
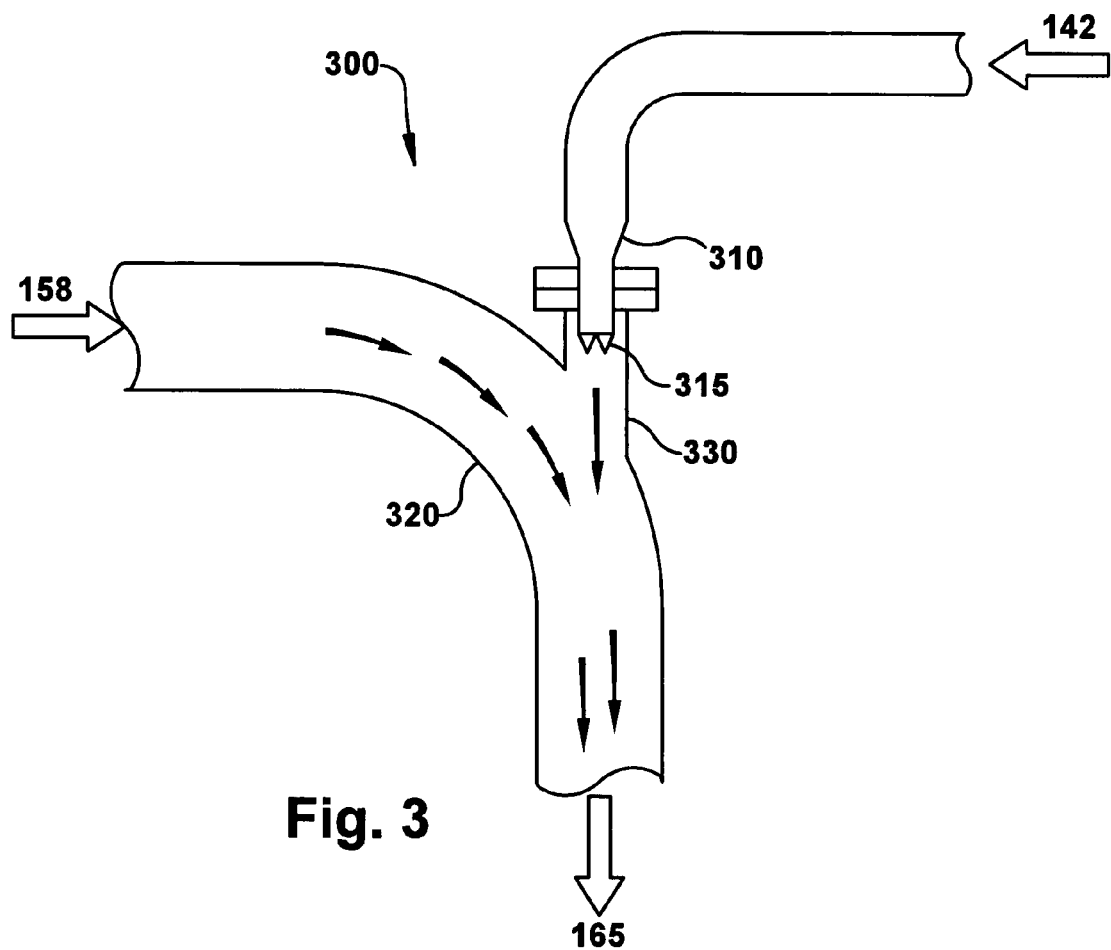
FIG. 3 is a cross-sectional view of one embodiment of the improved mixing junction used in the cooling and sealing air system of the exemplary turbomachine illustrated in FIG. 1.

FIG. 3 illustrates an improved mixing junction 300, as embodied by the invention, for mixing ejector and bypass flows instead of using a standard T component 160. The output of the ejector is indicated at 158 and the bypass flow is indicated at 142. The combined flows exit the mixing junction, indicated at 165. In one example, the mixing junction 300 is made of an elbow with a flange connection on the bend as shown in FIG. 3. A main pipe section 320 contains the flow from ejector 158 at one end, and the combined output flow 165 at the other end. A coupling pipe 330 is connected to the main pipe section 320. The coupling pipe 330 serves as a mount for nozzle 310 that directs bypass flow 142 into the main pipe section 320. Nozzle 310 also includes a nozzle tip 315, further described hereinafter. The advantage of this design is that the mixing junction 300 allows ejector flow 158 and bypass flow 142 to mix at a near 0° angle to their respective flow directions (as indicated by the arrow marks in FIG. 3). As bypass flow 142 does not decelerate the primary ejector flow, all the pressure available in bypass line 142 can be effectively utilized to reduce ejector back pressure, in turn improving over all entrainment ratio.

In addition, the bypass flow 142 is now flowing through a nozzle 310 that increases the velocity of the flow and hence adds momentum to the primary ejector flow at those operating conditions where bypass flow is significantly high. The effect of increased ejector flow velocity will reduce the static pressure of the flow increasing ejector performance. Overall, this configuration minimizes the pressure drop due to two stream mixing, and results in improved utilization of available high velocity bypass flow to reduce pressure at ejector discharge.

The nozzle sizing and the location of the nozzle 310 is governed by the flow requirement from the bypass line keeping turbine requirements into consideration and also meeting the requirement of minimizing pressure drop. The location of nozzle 310 is based on contradicting requirements to reduce any blockage losses caused by the nozzle but at the same time inducing the lowest pressure after jet expansion (vena-contracta) to be well into the main elbow so as to influence the main ejector flow to the maximum extent. Vena-contracta is the region of highest velocity or the lowest static pressure for the flow originating from the nozzle. Strategic location of the nozzle in such a way that the vena-contracta covers the maximum portion of the mixing zone (i.e., the area/volume where the two flow streams meet and mix) will help improve entrainment induced backpressure reduction for the ejector 150, and minimize turbulence and associated pressure loss in mixer 300.

In some applications, the benefit of the vena-contracta may be reduced by the obstruction effect produced by nozzle 310 and nozzle tip 315 (see FIG. 3), if these two elements project into main pipe section 320. Based on the specific application and average ambient conditions, the position of the nozzle 310 and nozzle tip 315 can be adjusted. The amount that nozzle 310 and nozzle tip 315 extend into main pipe section 320 (not shown in FIG. 3), or are set back from main pipe section 320 (shown in FIG. 3) is variable. The size or diameter of the nozzle 310 and nozzle tip 315 can also be adjusted. The variations on placement and size of nozzle 310 and nozzle tip 315 are determined based on the specific machine/system in which they are installed and the average ambient conditions in which the machine/system operates.

In situations where nozzle 310 and/or nozzle tip 315 project into main pipe section 320, the location of the nozzle 310 and/or nozzle tip 315 in the main pipe section 320 flow path diverts the incoming streamlines of the ejector discharge around the nozzle 310 and/or nozzle tip 315, disrupting the incoming velocity profile. This reinforces the turbulence associated with the jet bending due to altered flow direction at the bend in main pipe section 320, causing additional pressure drops and subsequent enhanced back pressure at the ejector discharge. By strategically locating the nozzle with the least amount of obstruction to the main ejector flow in main pipe section 320 or at the trade-off location having least impact of obstruction and maximum impact of vena-contracta induced low static pressure in the flow path, perturbation of the incoming streamlines and occurrence of eddies and vortex formation around the nozzle 310 and nozzle tip 315 can be minimized. When local conditions (i.e., specific system, and/or ambient temperatures) and vena-contracta position requirements, call for placement of the nozzle within main pipe section 320, the losses centered around the obstructing nozzle can be minimized by using a smaller diameter nozzle in the obstructing region.

Figure 4:
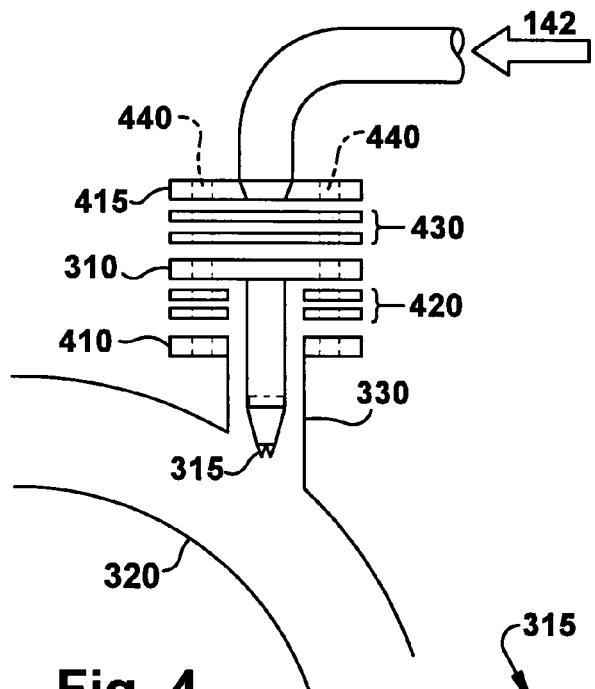
FIG. 4 is an exploded, cross-sectional view of one embodiment of the improved nozzle mounting means used in the cooling and sealing air system of the exemplary turbomachine illustrated in FIG. 1.

Referring to FIG. 4, coupling pipe 330 includes means for interchanging nozzles 310 and/or nozzle tips 315 of varying shapes, diameters, sizes and configurations, without a change to the entire piping configuration. In the past, the standard practice was to weld nozzle 310 onto flange 410. This provided an excellent bond, but it made removing or replacing nozzle 310 a difficult and time consuming process. A new and improved method, as embodied by the present invention, uses a plurality of spacers 420, 430 and fasteners (not shown) placed in through holes 440. Only two spacers 420 and 430 are shown in FIG. 4, but more or less could be used as further described hereinafter. This arrangement allows for quick and easy replacement of nozzle 310 and allows for variable axial positions of nozzle 310 within coupling pipe 330.

Spacers 420, 430 are typically formed of carbon steel or stainless steel, but any suitable material could be used. Each spacer 420, 430 can be from one sixteenth to two and one half inches thick, and more preferably one eighth to one quarter inch thick, but different thicknesses can be used or spacers having different thicknesses can by used together to obtain a desired axial position for nozzle 310. Any appropriate number of spacers 420, 430 can be used. For example, the number of spacers 420 and/or 430 could range between 1-100, 1-50 or 1-25, and all subranges therebetween. In one example, only one spacer can be used, resulting in two positions for the nozzle 310. In typical systems, the spacers can provide an axial adjustment range of between about +/−one sixteenth inch up to about +/−2½ inches, but greater or lesser ranges can be obtained by using more or less spacers or spacers of different thicknesses. In many applications it is desirable to maintain the distance between the top flange 415 and the bottom flange 410 constant. This is easily accomplished by the present invention, by using a uniform number of total spacers. For example to obtain an axial adjustment capability of 2½ inches with ¼" thick spacers, ten total spacers can be used. This example is for illustrative purposes only, and more or less total spacers and/or spacers having different thicknesses can be used. By maintaining the total of spacers constant (in this example, ten spacers), the distance between the top flange 415 and the bottom flange 410 is always the same. At one axial position of nozzle 310, ten spacers may be used between nozzle 310 and bottom flange 410, with no spacers present between nozzle 310 and top flange 415. At a second axial position, five spacers may be used between nozzle 310 and bottom flange 410, while five spacers are also present between nozzle 310 and top flange 415. At a third axial position of nozzle 310, two spacers may be used between nozzle 310 and bottom flange 410, with eight spacers present between nozzle 310 and top flange 415. This aspect of the present invention permits excellent control and adjustability of the axial position of nozzle 310 within coupling pipe 330.

The spacers 420, 430 can also be chosen from standard sizes that are readily available in local markets. By using standard size spacers, the hardware is readily available. The spacers are held between flanges 410 and 415 by suitable fasteners (not shown). The fasteners are typically bolts with corresponding nuts that pass through holes 440, but screws or any other suitable fastener could also be used. Holes 440 are present in each flange 410, 415, spacers 420, 430 and nozzle 310. The length of the fasteners are preferably sized to securely fasten the two flanges 410 and 415, spacers 420, 430 and nozzle 310 together. Typically, the fasteners are about twelve inches in length, but any suitable length can be used. The number of fasteners used is dictated by the flange rating and is typically around 8. However, more or less fasteners can be used as dictated by the specific system in which the nozzle 310 is being used.

The ability to easily switch out nozzle 310 is very beneficial when ambient conditions are highly variable. For example, in cold seasons with low average ambient temperatures a larger diameter nozzle 310 may be used, while in hotter seasons with warmer average ambient temperatures a smaller diameter nozzle 310 may be used. Another advantage in having a quick interchange capability, is that the down time for the turbine can be greatly reduced. This enables the operator of the turbine to keep the system online longer and will decrease any operational or monetary losses due to down time. The capability to vary the axial position, easily and quickly, of nozzle 310 within pipe 330 is helpful to adjust the mixer to specific systems and/or average ambient conditions.

Figure 5:
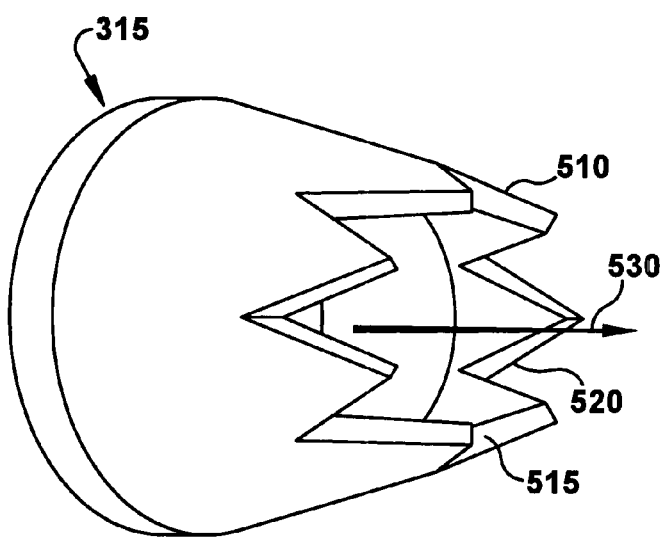
FIG. 5 is a perspective view of one exemplary embodiment of a nozzle tip that may be used with the mixing junction shown in FIG. 3.
Figure 6:
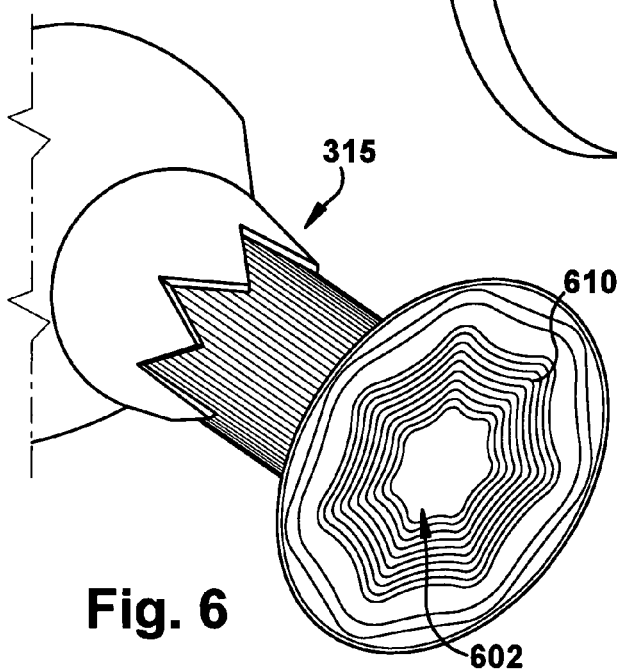
FIG. 6 is a perspective view of a cooling flow stream discharged from the nozzle tip shown in FIG. 4.

FIG. 5 is a perspective view of an exemplary motive nozzle tip 315 that may be used with mixing junction 300. FIG. 6 is a perspective view of an exemplary cooling jet 602 discharged from nozzle tip 315. The cross sectional area of nozzle tip 315 is convergent in the direction of flow and, in one embodiment, includes a plurality of protrusions 510 that extend substantially axially therefrom to define a nozzle lip 515. Protrusions 510 are identical and each has a substantially triangular shape. Protrusions 510 extend circumferentially about nozzle tip 315, such that a plurality of triangular recesses 520 are defined between each pair of circumferentially-adjacent protrusions 510. Specifically, protrusions 510 define a chevron-shaped nozzle lip 515 at an end of nozzle tip 315. In an alternative embodiment, nozzle tip 315 is slotted and includes a plurality of protrusions extending from a nozzle lip defined at an edge of the slotted nozzle tip. Protrusions 510 may be rounded such that nozzle tip 315 includes a plurality of round-edged cutouts. Moreover, although only seven protrusions 510 are illustrated, it should be noted that nozzle tip 315 may include more or less protrusions 510. In addition, the size, shape, number, and relative orientation of protrusions 510 is variably selected depending on the use of nozzle tip 315 to facilitate optimizing jet flow 530 discharged therefrom. More specifically, protrusions 510 and, more particularly, nozzle lip 515 facilitate creating a jet flow discharged therefrom with lobed-shaped vortices 610, for example, a lobed-shaped jet 602.

During operation, high-pressure air is channeled to mixing junction 300 and is discharged through inlet 142 into nozzle 310. Air at lower pressure is discharged through inlet 158. The high-pressure air flows substantially axially through motive nozzle 310 and is accelerated to high speed prior to being discharged through nozzle tip 315. The orientation of protrusions 510 facilitates discharged air from nozzle tip 315 creating lobed-shaped jet 602. The shape, velocity, and pressure of lobed-shaped jet 602 facilitates jet 602 entraining the low-pressure air causing the high-pressure and low-pressure air to mix efficiently. The mixed air is then discharged through mixing junction output 165, such that the mixture of high-pressure and low-pressure air is utilized to facilitate cooling turbine 104. In alternative embodiments, the mixed air may be used to cool other components of turbine 104, such as, but not limited to, bearings, buckets, nozzles, blades, outer casings and wheel spaces.

The nozzle tip 315 is configured to facilitate the formation of longitudinal flow structures (such as lobes or counter-rotating vortices) that stabilize the jet. Furthermore, the nozzle tip is configured to resist formation of other destabilizing flow structures (such as ring vortices) when the jet is perturbed by noise or other flow disturbances. Specifically, during turbine operations, the lobed-shaped jet 602 created by protrusions 510 facilitates increasing the life-span of mixing junction 300. Specifically, the protrusions 510 facilitate reducing the intensity and symmetry of flow disturbances produced by or associated with jet bending oscillations, such as coherent ring vortices. Typically, jet bending oscillations in a mixing junction cause acoustic waves to reflect off the casing wall and back towards the motive nozzle. The lobes created in jet 602 by protrusions 510 reduce the coherency of circumferential turbulent flow structure produced by jet bending, interfering with reinforcement of such flow structures by acoustic waves reflected from the casing wall. Furthermore, because the nozzle interior trailing edges produced by protrusions 510 lie outside of a plane normal to the nozzle, the ability of reflected acoustic waves to excite further jet bending oscillation is reduced. Specifically, protrusions 510 facilitate preventing a reflected wave from oscillating in phase with oscillations of jet 602, such that the oscillations are disrupted and not enhanced. As such, protrusions 510 facilitate disrupting both the formation and excitation of jet bending oscillations, and thereby, facilitate reducing the effects that jet bending oscillations may have on mixing junction 300.

As a result of protrusions 510, less vibration is induced to mixing junction 300 by jet bending oscillations as flow is discharged from nozzle tip 315. Furthermore, nozzle tip 315 and, more particularly, protrusions 510, facilitate reducing the excitation of any resonance and vibrations induced to mixing junction 300. Accordingly, mixing junction 300 generates substantially less noise, and experiences substantially reduced fluctuating structural loads than other known mixing junctions. As such, a useful life of mixing junction and other connected devices is facilitated to be enhanced, and environmental noise produced by the mixing junction is reduced.

The above-described methods and apparatus facilitate increasing the life span of a mixing junction and reducing environmental noise produced by its operation. Specifically, the chevron-shaped nozzle tip produces a lobed-shape jet that facilitates reducing jet bending oscillations which may occur in a mixing junction motive nozzle. Furthermore, the lobed-shaped jet facilitates reducing the excitation of jet bending oscillations, such that vibrations induced to the mixing junction motive nozzle are reduced. Subsequently, less noise and fewer structural loads are generated within the mixing junction. Moreover, the chevron-shaped nozzle tip also increases entrainment of the low-pressure air, allowing the mixing to operate more efficiently. Ultimately, the above-described methods and apparatus facilitate providing a more efficient and more stable mixing junction, such that system engine efficiency may increase, costs associated with maintenance of the mixing junction and devices in flow communication with the mixing junction may decrease, and the life-span of the system may increase.

While the invention has been described in connection with what is presently considered to be one preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for mixing flows from a compressor, the system comprising:
    an ejector for receiving a first flow and a second flow from said compressor, and an ejector output for combining said first and second flows into a third flow;
    said first flow having a first pressure and a first temperature, and said second flow having a second pressure and a second temperature, wherein said first and second pressures are different and said first and second temperatures are different;
    a bypass flow connecting said first flow and said third flow, the third flow having a third pressure and a third temperature, wherein the third pressure is different from said first and second pressures and the third temperature is different from said first and second temperatures;
    a mixer for combining only said bypass flow and said third flow to provide a fourth flow, said fourth flow having a pressure and temperature intermediate said pressure and temperature of the bypass flow and the third flow, and where said fourth flow is input to a turbine;
    wherein said bypass flow intersects with said third flow at a mixing angle that reduces back pressure on the ejector output, said mixing angle is at least about 0 degrees, but not more than about 90 degrees.

2. The system for mixing flows according to claim 1, wherein said mixing angle is at least about 0 degrees, but not more than about 45 degrees.

3. The system for mixing flows according to claim 1, wherein said mixing angle is at least about 0 degrees, but not more than about 15 degrees.

4. The system for mixing flows according to claim 1, wherein said mixer comprises a first mixing input port, a second mixing input port and a mixing output poll,
    said first mixing input port for receiving said third flow;
    said second mixing input port for receiving said bypass flow, and said second mixing input port comprises a nozzle for increasing a velocity of said bypass flow;

said mixing output port combining said bypass flow and said third flow, wherein, the mixer reduces back pressure on the ejector output.

5. The system for mixing flows according to claim 4, wherein said nozzle includes a nozzle tip having a chevron shape.

6. The system for mixing flows according to claim 4, wherein said mixing angle is at least about 0 degrees, but not more than about 45 degrees.

7. The system for mixing flows according to claim 4, wherein said mixing angle is at least about 0 degrees, but not more than about 15 degrees.

8. The system for mixing flows according to claim 4, wherein said second mixing input port comprises:

nozzle mounting flange means, said nozzle mounting flange means being positioned relative to said nozzle at a position, said position comprising at least one of above and below said nozzle;

at least one spacer, said at least one spacer placed between said nozzle and said nozzle mounting flange means, said at least one spacer adapted for positioning said nozzle at multiple axial positions within said second mixing input port.

9. The system for mixing flows according to claim 8, further comprising removable fasteners, wherein said nozzle mounting flange means, said nozzle, and said at least one spacer are fastened together with said removable fasteners, said removable fasteners allowing nozzles of different sizes to be installed in said second mixing input port.

10. A system for mixing flows from a compressor, the system comprising:

an ejector for receiving a first flow and a second flow from said compressor, and an ejector output for combining said first and second flows into a third flow;

a bypass flow, connected between said first flow and said third flow;

a mixer for combining only said bypass flow and said third flow to provide a fourth flow, and where the fourth flow is input to a turbine;

wherein, said bypass flow intersects with said third flow at a mixing angle that reduces back pressure on the ejector output, said mixing angle is at least about 0 degrees, but less than about 90 degrees.

11. The system for mixing flows according to claim 10, said mixing angle is at least about 0 degrees, but not more than about 45 degrees.

12. The system for mixing flows according to claim 10, wherein said mixing angle is at least about 0 degrees, but not more than about 15 degrees.

13. The system for mixing flows according to claim 10, wherein said mixer comprises a first mixing input port, a second mixing input port and a mixing output port, said first mixing input port for receiving said third flow;

said second mixing input port for receiving said bypass flow, and said second mixing input port comprises a nozzle and a nozzle tip for increasing a velocity of said bypass flow;

said mixing output port combining said bypass flow and said third flow into a fourth flow, wherein, the mixer reduces back pressure on the ejector output.

14. The system for mixing flows according to claim 13, wherein said nozzle includes a nozzle tip having a chevron shape.

15. The system for mixing flows according to claim 13, wherein said mixing angle is at least about 0 degrees, but not more than about 45 degrees.

16. The system for mixing flows according to claim 13, wherein said mixing angle is at least about 0 degrees, but not more than about 15 degrees.

17. The system for mixing flows according to claim 13, wherein said second mixing input port comprises:

nozzle mounting flange means, said nozzle mounting flange means having opposing parts that are placed above and below said nozzle;

at least one spacer, said at least one spacer placed between said nozzle and said nozzle mounting flange means, said at least one spacer enabling said nozzle to be positioned at multiple axial positions within said second mixing input port.

18. The system for mixing flows according to claim 17, wherein said nozzle mounting flange means, said nozzle, and said at least one spacer are fastened together with removable fasteners, said fasteners allowing nozzles of different sizes to be installed in said second mixing input port.

19. The system for mixing flows according to claim 17, wherein the number of said at least one spacer remains constant throughout different axial positions of said nozzle, to permit a distance between opposing parts of said nozzle mounting flange means to remain constant.

20. The system for mixing flows according to claim 17, wherein said at least one spacer is between about one sixteenth inch to about two and one half inches in thickness.

* * * * *